US 9,529,862 B2

(12) United States Patent
Sarwar et al.

(10) Patent No.: US 9,529,862 B2
(45) Date of Patent: Dec. 27, 2016

(54) HEADER-TOKEN DRIVEN AUTOMATIC TEXT SEGMENTATION

(71) Applicant: PayPal, Inc., San Jose, CA (US)

(72) Inventors: Badrul M. Sarwar, San Jose, CA (US); John A. Mount, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/724,269

(22) Filed: May 28, 2015

(65) Prior Publication Data

US 2015/0261761 A1 Sep. 17, 2015

Related U.S. Application Data

(63) Continuation of application No. 14/100,990, filed on Dec. 9, 2013, now Pat. No. 9,053,091, which is a continuation of application No. 11/646,900, filed on Dec. 28, 2006, now Pat. No. 8,631,005.

(51) Int. Cl.
*G06F 17/30* (2006.01)
*G06F 17/27* (2006.01)

(52) U.S. Cl.
CPC ......... *G06F 17/3053* (2013.01); *G06F 17/277* (2013.01); *G06F 17/2775* (2013.01); *G06F 17/30312* (2013.01); *G06F 17/30598* (2013.01)

(58) Field of Classification Search
CPC .............. G06F 17/2785; G06F 17/3043; G06F 17/30684; G06F 17/27; G06F 17/2775; G06F 17/2715; G06F 17/2809; G06F 17/30654; G06F 17/30864; G06F 17/30011; G06F 17/30675; G06F 17/30672; G06F 15/16; G06F 17/2818; G06F 17/289; G06F 17/3053; G06F 17/277; G06F 17/30598; G06F 17/30312; G06F 17/30; G06F 17/30867; G06F 17/2705; G06F 17/28; G06F 17/30554; G06F 17/2247; G06F 17/241; G06F 17/271

See application file for complete search history.

(56) References Cited

U.S. PATENT DOCUMENTS

| | | |
|---|---|---|
| 4,068,298 A | 1/1978 | Dechant et al. |
| 4,914,704 A | 4/1990 | Cole et al. |
| 5,343,554 A | 8/1994 | Koza et al. |
| 5,440,733 A | 8/1995 | Yamazaki et al. |
| 5,680,628 A | 10/1997 | Carus et al. |
| 5,737,608 A | 4/1998 | Van De Vanter |

(Continued)

OTHER PUBLICATIONS

Antonio Molina et al.—"APOLN: A Partial Parser of Unrestricted Text"—Department of Information Systems and Computation Valencia University of Technology—Proceedings of SNRFAI99, . . . , 1999—users.dsic.upv.es—pp. 1-10.*

(Continued)

*Primary Examiner* — Anh Ly
(74) *Attorney, Agent, or Firm* — Maschoff Brennan

(57) ABSTRACT

A method and a system to automatically segment text based on header tokens is described. A relevance value and an irrelevance value are determined for each token in a description, assuming no tokens are left out of computations. The irrelevance value is based on occurrences of a token in a sample set of descriptions. The relevance value is an estimated probability of relevance based on the header of the description being segmented.

20 Claims, 9 Drawing Sheets

(56) References Cited

U.S. PATENT DOCUMENTS

| | | | |
|---|---|---|---|
| 5,752,058 A | 5/1998 | Van De Vanter | |
| 5,778,363 A | 7/1998 | Light | |
| 5,794,177 A | 8/1998 | Carus et al. | |
| 5,802,539 A | 9/1998 | Daniels et al. | |
| 6,016,467 A | 1/2000 | Newsted et al. | |
| 6,018,710 A | 1/2000 | Wynblatt et al. | |
| 6,081,774 A | 6/2000 | de Hita et al. | |
| 6,108,632 A | 8/2000 | Reeder et al. | |
| 6,151,645 A * | 11/2000 | Young | G06F 13/4086 710/315 |
| 6,313,833 B1 * | 11/2001 | Knight | G06F 3/04847 705/35 |
| 6,374,210 B1 * | 4/2002 | Chu | G06F 17/2863 704/9 |
| 6,421,655 B1 | 7/2002 | Horvitz et al. | |
| 6,460,025 B1 | 10/2002 | Fohn et al. | |
| 6,529,902 B1 | 3/2003 | Kanevsky et al. | |
| 6,643,640 B1 | 11/2003 | Getchius et al. | |
| 6,810,375 B1 | 10/2004 | Ejerhed | |
| 6,944,612 B2 | 9/2005 | Roustant et al. | |
| 6,963,830 B1 | 11/2005 | Nakao | |
| 7,096,210 B1 | 8/2006 | Kramer et al. | |
| 7,130,837 B2 | 10/2006 | Tsochantaridis et al. | |
| 7,133,862 B2 | 11/2006 | Hubert et al. | |
| 7,139,752 B2 | 11/2006 | Broder et al. | |
| 7,146,361 B2 | 12/2006 | Broder et al. | |
| 7,321,928 B2 | 1/2008 | Feltin et al. | |
| 7,480,669 B2 | 1/2009 | Lo et al. | |
| 7,516,130 B2 | 4/2009 | Ren et al. | |
| 7,542,971 B2 | 6/2009 | Thione et al. | |
| 7,574,347 B2 | 8/2009 | Wang | |
| 7,769,626 B2 * | 8/2010 | Reynolds | G06Q 10/06 705/7.32 |
| 7,917,354 B2 | 3/2011 | Ceusters et al. | |
| 8,024,174 B2 * | 9/2011 | Wang | G06F 17/2818 704/6 |
| 8,265,925 B2 | 9/2012 | Aarskog | |
| 8,296,123 B2 | 10/2012 | Thayer et al. | |
| 8,631,005 B2 | 1/2014 | Sarwar et al. | |
| 9,053,091 B2 | 6/2015 | Sarwar et al. | |
| 2002/0069204 A1 | 6/2002 | Kahn et al. | |
| 2002/0174132 A1 | 11/2002 | Silverman | |
| 2003/0001880 A1 | 1/2003 | Holtz et al. | |
| 2003/0033347 A1 | 2/2003 | Bolle et al. | |
| 2003/0110131 A1 | 6/2003 | Alain et al. | |
| 2003/0187642 A1 | 10/2003 | Ponceleon et al. | |
| 2004/0030556 A1 * | 2/2004 | Bennett | G06F 17/27 704/270 |
| 2004/0093321 A1 | 5/2004 | Roustant et al. | |
| 2004/0162827 A1 | 8/2004 | Nakano | |
| 2004/0194035 A1 | 9/2004 | Chakraborty | |
| 2004/0199375 A1 | 10/2004 | Ehsani et al. | |
| 2004/0205568 A1 * | 10/2004 | Breuel | G06F 17/211 715/205 |
| 2004/0236725 A1 | 11/2004 | Amitay et al. | |
| 2004/0243554 A1 | 12/2004 | Broder et al. | |
| 2004/0267686 A1 | 12/2004 | Chayes et al. | |
| 2005/0004903 A1 | 1/2005 | Tsuda | |
| 2005/0108200 A1 | 5/2005 | Meik et al. | |
| 2005/0108325 A1 | 5/2005 | Ponte | |
| 2005/0125311 A1 | 6/2005 | Chidiac et al. | |
| 2005/0165753 A1 | 7/2005 | Chen et al. | |
| 2005/0197927 A1 | 9/2005 | Martineau et al. | |
| 2005/0222989 A1 | 10/2005 | Haveliwala et al. | |
| 2005/0234906 A1 * | 10/2005 | Ganti | G06F 17/30569 707/E17.006 |
| 2006/0004732 A1 | 1/2006 | Odom | |
| 2006/0020596 A1 | 1/2006 | Liu et al. | |
| 2006/0069589 A1 | 3/2006 | Nigam et al. | |
| 2006/0184521 A1 | 8/2006 | Ponte | |
| 2006/0184566 A1 | 8/2006 | Lo et al. | |
| 2006/0195461 A1 * | 8/2006 | Lo | G06F 17/30011 707/E17.008 |
| 2006/0242192 A1 | 10/2006 | Musgrove et al. | |
| 2006/0265415 A1 | 11/2006 | Abrams et al. | |
| 2006/0277032 A1 | 12/2006 | Hernandez-abrego et al. | |
| 2007/0113172 A1 | 5/2007 | Behrens et al. | |
| 2007/0113222 A1 | 5/2007 | Dignum et al. | |
| 2007/0129938 A1 * | 6/2007 | Wang | G06F 17/2818 704/10 |
| 2007/0214140 A1 * | 9/2007 | Dom | G06F 17/30707 707/E17.09 |
| 2008/0010226 A1 | 1/2008 | Brinker et al. | |
| 2008/0077570 A1 * | 3/2008 | Tang | G06F 17/30684 707/E17.108 |
| 2008/0098300 A1 * | 4/2008 | Corrales | G06F 17/30896 715/243 |
| 2008/0162520 A1 | 7/2008 | Sarwar et al. | |
| 2009/0222329 A1 * | 9/2009 | Ramer | G06F 17/30749 705/14.52 |
| 2009/0259459 A1 * | 10/2009 | Ceusters | G06F 17/2775 704/9 |
| 2010/0076994 A1 * | 3/2010 | Soroca | G06F 17/30749 707/769 |
| 2010/0174716 A1 | 7/2010 | Elbaz et al. | |
| 2013/0211823 A1 | 8/2013 | Ceusters et al. | |
| 2014/0074826 A1 * | 3/2014 | Cooper | G06F 17/30672 707/722 |
| 2014/0172858 A1 | 6/2014 | Sarwar et al. | |

OTHER PUBLICATIONS

M Heller and G Vogeler—"Radbound Respository—PDF hosted at the Radboud Repository of the Radboud University Nijmegen"—Royal Netherlands Academy of Arts and Sciences Amsterdam, 2005 Proceedings of the VI international conference of the Association for History and Computing Sep. 14-17, 2005—pp. 1-309.*

U.S. Appl. No. 11/646,900, Appeal Decision mailed Mar. 22, 2013, 17 pgs.

U.S. Appl. No. 11/646,900, Final Office Action mailed May 15, 2009, 23 pgs.

U.S. Appl. No. 11/646,900, Non Final Office Action mailed Apr. 26, 2013, 5 pgs.

U.S. Appl. No. 11/646,900, Non-Final Office Action mailed Oct. 29, 2008, OARN, 27 pgs.

U.S. Appl. No. 11/646,900, Notice of Allowance mailed Sep. 9, 2013, 11 pgs.

U.S. Appl. No. 11/646,900, Response filed Mar. 2, 2009 to Non-Final Office Action mailed Oct. 29, 2008, 21 pgs.

U.S. Appl. No. 11/646,900, Response filed Jul. 15, 2009 to Final Office Action mailed May 15, 2009, 18 pgs.

U.S. Appl. No. 11/646,900, Response filed Jul. 26, 2013 to Non Final Office Action mailed Apr. 26, 2013, 7 pgs.

U.S. Appl. No. 14/100,990, Examiner Interview Summary mailed Dec. 23, 2014, 3 pgs.

U.S. Appl. No. 14/100,990, Non Final Office Action mailed Sep. 18, 2014, 23 pgs.

U.S. Appl. No. 14/100,990, Notice of Allowance mailed Feb. 5, 2015, 10 pgs.

U.S. Appl. No. 14/100,990, Response filed Dec. 14, 2014 to Non Final Office Action mailed Sep. 18, 2014, 13 pgs.

Borkar, V., et al., "Automatic Segmentation of Text into Structured Records", in Proceedings of the 2001 ACM SIGMOD International Conference on Management of Data (Santa Barbara, CA, USA) T. Sellis (Ed.), ACM Press, New York, NY, USA., (May 21-24, 2001), 175-186.

Chapman, Flack, "Better Logging through Formality", Recent Advances in Intrusion Detection Lecture Notes in Computer Science vol. 1907, 2000, (Nov. 11, 2000), 1-16.

Hearst, Marti A, "Multi-paragraph segmentation of expository text", University of California, Berkeley, Berkeley, CA, Proceedings of the 32nd annual meeting on Association for Computational Linguistics, (1994), 9-16.

Knudsen, Harold K, "Linked State Machine Foundations", [Online]. Retrieved from the Internet: <ftp at: ftp.cs.unm. edu/pub/. . . , 1995—Citeseer-PSU.edu>, (Nov. 12, 1996), 1-24.

(56) References Cited

OTHER PUBLICATIONS

Rosen-Zvi, M., et al., "The Author-Topic Model for Authors and Documents", (Bariff, Canada), ACM International Conference Proceeding Series, vol. 70,M. Chickering and J. Halpern (Eds.), AUAI Press, Arlington, VA, USA., (Jul. 7-11, 2004), 487-494.

Steyvers, M., et al., "Probabilistic Author-Topic Models for Information Discovery", in Proceedings of the Tenth ACM SIGKDD International Conference on Knowledge Discovery and Data Mining,(Seattle, WA, USA), ACM Press, New York, NY, USA., (Aug. 22-25, 2004), 306-315.

Steyvers, M., et al., "Probabilistic author-topic models for information discovery", Proceedings of the Tenth ACM SIGKDD International Conference on Knowledge Discovery and Data Mining, International Conference on Knowledge Discovery and Data Mining, (Aug. 2004), 306-315.

Yamron, J.P., et al., "A hidden Markov model approach to text segmentation and event tracking", in Proceedings of the 1998 IEEE International Conference on Acoustics, Speech, and Signal Processing, vol. 1, (Seattle, WA, USA), (May 12-15, 1998), 333-336.

\* cited by examiner

HEADER-TOKEN DRIVEN AUTOMATIC TEXT SEGMENTATION

CLAIM OF PRIORITY

This application is a Continuation of and claims the benefit of priority to U.S. patent application Ser. No. 14/100,990, entitled "HEADER-TOKEN DRIVEN AUTOMATIC TEXT SEGMENTATION", filed on Dec. 9, 2013, which is a continuation of application Ser. No. 11/646,900, entitled "HEADER-TOKEN DRIVEN AUTOMATIC TEXT SEGMENTATION", filed on Dec. 28, 2006, now U.S. Pat. No. 8,631,005, which applications are hereby incorporated by reference in their entirety.

TECHNICAL FIELD

The present application relates generally to the technical field of data analysis and, in one specific example, to token driven automatic segmentation of a description.

BACKGROUND

E-commerce websites attempt to use relevant product descriptions to organize results and to improve user experience. However, product descriptions, particularly those supplied by sellers, tend to contain irrelevant information (e.g., information about the end-user, shipping information, etc.). A technique such as supervised text segmentation can be employed to identify relevant segments of descriptions.

Text segmentation is the process of dividing text (e.g., a paragraph, page, description, etc.) into meaningful units, such as breaking down a body of text into meaningful clauses or phrases. For a machine to perform text segmentation, units of texts (e.g., words) are tagged to guide the machine. Segmenting text using tags previously defined by a user is referred to as supervised text segmentation.

One example of a challenge that may exist for supervised text segmentation techniques is the expense of manually tagging data. Human annotators mark the relevant and irrelevant portions of some training cases. A system then attempts to learn a set of rules from the training cases to segment subsequent new cases. Such supervised techniques may require a large number of tagged training cases. Another example of a challenge that may exist is that such training cases cannot be generalized across different types of products. As a result, supervised techniques may also face a challenge in terms of scalability.

BRIEF DESCRIPTION OF THE DRAWINGS

Some embodiments are illustrated by way of example and not limitation in the figures of the accompanying drawings in which.

DETAILED DESCRIPTION

Figure 1:
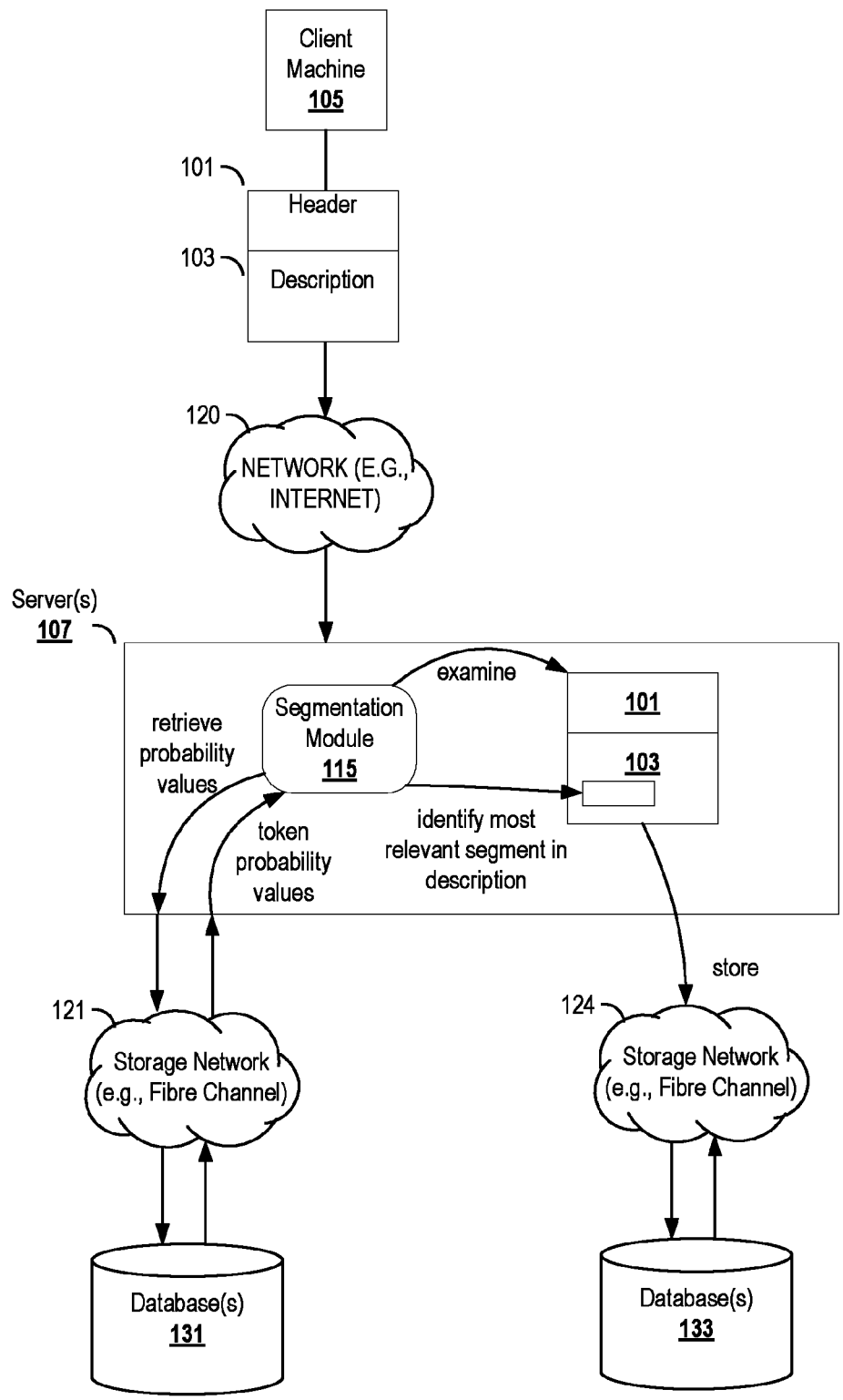
FIG. 1 is a schematic depiction of an example of a system that automatically segments text of a description.

Example methods and systems to automatically segment an unstructured description based on a header of the description are described. In the following description, for purposes of explanation, numerous specific details are set forth in order to provide a thorough understanding of example embodiments. It will be evident, however, to one skilled in the art that the present invention may be practiced without these specific details. For instance, tokens are often represented in depicted examples as words of text. However, the described embodiments should not be limited to words. A token may be a word, character, number, motion command, image, etc., that conveys and/or represents some meaning dependent upon language and/or subject matter.

As used herein, a "token" is a unit of text that has meaning according to lexical rules, which may vary with language and/or subject matter. "Text" refers to a body of tokens that collectively conveys information. A "description" is text that should convey information about an item, whether concrete or abstract. A "header," as used herein, is body of text shorter than a description that provides information about the description (e.g., title, abstract, summary, synopsis, etc.).

Without requiring expensive tagging of data beforehand, unstructured text (e.g., text without tags) can still be automatically segmented using tokens that occur in a header as hints of relevance. Using header tokens as hints of relevance allows for efficient segmentation of a description into a relevant segment and one or more irrelevant segments. A high density of header tokens in a description frequently occurs in a relevant segment. This heuristic is utilized to estimate a probability of token relevance based on 1) occurrence of a header token in the description and 2) occurrence of a token in the description with a lexical association with one or more of the header tokens, which suggests high relevance.

Automatic text segmentation utilizes both the probability of token relevance and a probability of token irrelevance. The probability of token irrelevance can be estimated with the frequency of a particular token throughout descriptions of a sample data set (e.g., sample set of data that includes headers and descriptions). For example, the probability of token irrelevance for a word in a description is estimated based on the number of descriptions in the sample data set that contain the word with respect to the total number of descriptions of the sample data set. The probability of token relevance for a word can be estimated based on one of multiple possibilities. For example, if the word in the description also occurs in the header, then the probability of token relevance may be estimated based on occurrence of the word in the header with respect to the number of words in the header. In another example, the probability of token relevance may be estimated based on the number of descriptions and headers in the sample data set that contains the word in both the description and header with respect to the total number of descriptions and headers in the sample data set.

After determining the estimated probabilities for tokens, different segments of the description (e.g., different sequences of tokens) are selected and a probability of segment relevance for the selected segment is computed. The probability of segment relevance for the selected segment is computed based on the estimated probabilities of token relevance for those tokens in the selected segment and the estimated probabilities of token irrelevance for those tokens not in the selected segment. Eventually, one of the segments is identified as most relevant for the description based on the computed probabilities for the different segments. The identified segment may be utilized to enhance user experience, organize data, improve accuracy of estimations, establish and/or revise models and/or rules for segmentation, etc. For example, font of the identified segment may be modified to emphasize the identified segment over the other segments of a description; the identified segment may be used as an index to descriptions; a user may be presented with the header and the identified segment instead of the description; the identified segment may be a hyperlink that can be selected for display of the full description; etc.

FIG. 1 is a schematic depiction of an example of a system that automatically segments text of a description. A client machine 105 transmits a description 103 and a header 101 for the description 103 to a server(s) 107 via a network 120 (e.g., Internet, LAN, WAN, etc.). The description 103 may be of an abstract item (e.g., stock, service, etc.) or a concrete item (e.g., land, automobile, collectible, tickets, etc.). In addition, the header and the description may be supplied as HTML files, Java language files, XML files, a proprietary database file, etc.

The server(s) 107 hosts a segmentation module 115 (e.g., embodied within a listing creation application, application specific integrated circuit, combination of hardware and software, instantiated as a single process, instantiated as multiple processes, instantiated as a single thread, instantiated as multiple threads, embodied as a program, embodied as a function, etc.) examines the header 101 and the description 103. The segmentation module 115 retrieves probability values from a database(s) 131 over a storage network (e.g., Fibre Channel and any controllers). For example, the segmentation module 115 accesses a structure that indicates a variety of previously observed tokens. The segmentation module 115 looks up tokens that occur in the description 103 in the structure, and retrieves probability values for the tokens. Embodiments are not limited to a particular technique for retrieving and/or generating the probability values, and embodiments should not be constrained by a particular temporal relationship between generation and use of the values. Instead of being looked-up, the probability values may be generated on the fly and immediately used. The probability values may be generated in advance and then retrieved from a database. The functionality for generating values may be embodied together with the automatic segmentation functionality, separately from the segmentation functionality, etc. For example, the segmentation module 115 may submit a list of the tokens that occur in the description 103 to another module on the server(s) 107, which then generates and/or retrieves the probability values based on the list of tokens. In another example, the segmentation module 115 (or another module) examines descriptions and headers in a sample data set to generate the probability values. Furthermore, the probability values and/or the sample data set are not necessarily remote, and may be local to the segmentation module 115. The segmentation module 115 uses the probability values to identify a most relevant segment in the description 103. The server(s) 107 then stores the header 101 and the description 103 into a database(s) 133 via a network 124. Of course, the above is an example and it should be appreciated that the details are intended to aid in understanding embodiments and should not be interpreted as limiting. For example, the header and the description are not necessarily stored on a remote database (e.g., the header and the description may be stored locally; the header and the description may be transmitted back to the client machine and not stored in the server; the header and the description may be written to separate locations remotely or locally; etc.).

Indication of a relevant segment of a description may be employed for a variety of uses. For example, the indication may be employed to reduce screen clutter and convey useful information to a user more efficiently (e.g., a user may only be presented with the relevant segment or relevant segment and the header; a user may be presented with the relevant segment in bold and the irrelevant segment(s) without font enhancements; etc.). A relevant segment of a description may be indicated to reduce content display for devices with smaller displays (e.g., mobile phones, personal data assistants, etc.). Relevant segment indications may be utilized to organize data, for machine learning, etc. Moreover, the numerous applications of automatic unsupervised segmentation are achieved without the expense of manual tagging.

Figure 2:
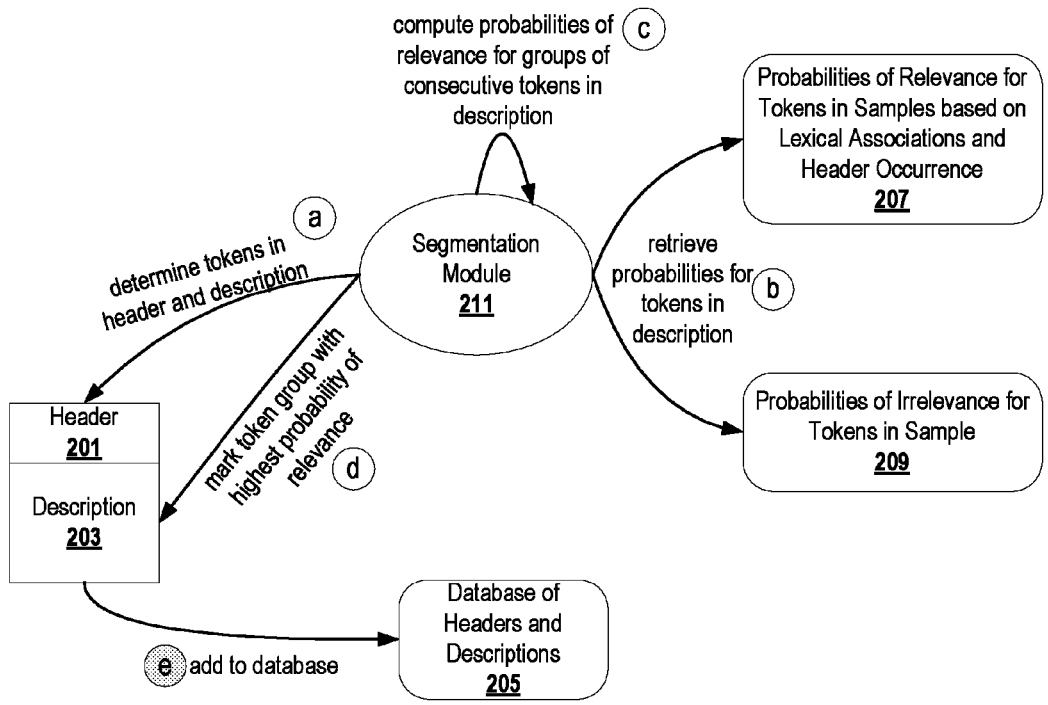
FIG. 2 is a graphical depiction of an example of a text segmentation process examining a description and a header.

FIG. 2 is a graphical depiction of an example of a text segmentation process examining a description and a header. FIG. 2 depicts example operations with indications of time by letter. These indications of time are not necessarily discrete and/or sequential. Operations may be performed in parallel, assigned to different hardware/software, etc. At a time "a," a segmentation module 211 determines tokens that occur in a header 201 and a corresponding description 203. At a time "b," the segmentation module 211 retrieves probabilities for tokens in the description 203 from a set of probabilities of irrelevance 209. As stated above, these probabilities may have been previously generated by the segmentation module 211 and/or another module, may be currently generated, etc. The segmentation module 211 retrieves probabilities of irrelevance for tokens in descriptions and headers in a sample data set. The sample data set can be developed in accordance with a variety of techniques (e.g., start with seed descriptions and headers manually entered, randomly generated, etc., and expanded with descriptions and headers entered by end-users, received over a network, etc.; build only with descriptions and headers entered by end-users, received from a remote source, etc.; select descriptions and headers from particular sources, with particular content, satisfying certain criteria, etc., and use as samples; use a subset of available descriptions and headers; utilize a subset of available descriptions and header and randomly/periodically/as prompted modify the subset; etc.). The probability of irrelevance for a token represents the possibility that the token is not relevant to a corresponding item. With a supervised technique, the descriptions in a sample data set would have been manually tagged and the probability of irrelevance for a token would be based on the token being tagged as irrelevant. The cost of manually tagging may be prohibitive, thus the subject description is probably unstructured text. Therefore, the probability of irrelevance for a token is estimated. In this example, the probability of irrelevance is overestimated using frequency of the token in the samples. The probability of irrelevance may be estimated based on different observations of the token in the sample data set (e.g., ratio of the number of descriptions in the sample data set that includes the token to the total number of descriptions in the sample data set; the ratio of the number of occurrences of the token throughout the sample data set to the total number of tokens in the sample data set; the number of descriptions in the sample data set of a particular category of product that includes the token with respect to the total number of descriptions in the sample data set in that particular product category; etc.).

The segmentation module 211 also retrieves probabilities of relevance for tokens in the description 203 from a set of probabilities 207. The probabilities 207 include probabilities of relevance for tokens based on lexical associations and/or occurrences in headers of the sample data set. The relevance probabilities are estimates (e.g., previously generated, generated on the fly, etc.) and/or pre-defined values. For instance, a relevance probability value may be an estimate based on frequency of the particular token in descriptions of a sample data set and respective headers of the sample data set (e.g., data units in the sample data set that include the token in both the description and the corresponding header). In another instance, the relevance probability is a pre-defined value (e.g., specifically defined values, defined with respect to variables, etc.) selected for the token (e.g., associated with the token, assigned to the token, etc.) based on the condition that the token occurs in a subject header and a subject description 203. For example, if a token occurs in both the header 201 and the description 203, the token is assigned a relevance probability of any one of a particular value (e.g., 1.0, 0.75, etc.), a pre-defined value based on variables (e.g., frequency of the token in the header over the total number of tokens in the header). In addition, adjusters/modifiers may also be applied to pre-defined values or variables based on various criteria, such as item category, size of the sample data set, etc.

Automatic segmentation also takes into account a lexical association between tokens for the relevance probability. Automatic segmentation may use a variety of techniques to ascertain whether a lexical association exists. For example, the segmentation module 211 (or some other module) accesses a table using the subject token (e.g., "bicycle"). An entry in the table for the token "bicycle" indicates lexically associated tokens "wheels," "seat," and "chain." The observance of any of these associate tokens in the header suggests that the token "bicycle" is relevant. Hence, a relevance probability is selected or generated that indicates likelihood of relevance. Again, a variety of relevance probabilities can be selected or generated as discussed. In addition, the occurrence of multiple associate tokens in the header may be considered to enhance the relevance probability for a token (e.g., relevance probability is x if one associate token observed in the header, x*y if y associate tokens are observed in the header, a constant 1.0 if all associate tokens are observed in the header, etc.). In another example, the sample data set is examined to generate probabilities based on observance of one of the tokens in the subject header and in a header and corresponding description of the sample data set.

After retrieving probabilities for the tokens in the description, the segmentation module 211 computes probabilities of relevance for groups of sequential tokens or segments of the description at a time "c." The segmentation module 211 computes the relevance probabilities for the different groups based on retrieved probabilities of relevance for members of the group and retrieved probabilities of irrelevance for tokens that are not members of the group. At a time "d," the segmentation module 211 marks each of the groups of tokens with the greatest probability of relevance, and the header and marked description are added to a database 205. As stated above with respect to FIG. 1, the header and the description may be handled in any one of a variety of techniques after the segmentation module 211 indicates the group of sequential tokens with the greatest relevance value.

In the above examples, automatic segmentation employs unsupervised learning (class of machine learning that does not require tagged data). With unsupervised learning, automatic segmentation is adaptable to a large number of item categories. Simulating training data in a deliberately inconsistent manner allows expectation maximization (method in statistics for finding maximum likelihood estimates of parameters in probabilistic models), such as self training of hidden Markov model (HMM) models. Using tokens in the header as hints of relevance allows efficient, inexpensive, and accurate automatic segmentation of a description.

An accurate estimation of the probabilities requires exact tagging of relevant and irrelevant segments of the text. The described embodiments avoid such exact tagging and allow the probabilities to be overestimated. Using maximum likelihood techniques, deliberate overestimation doesn't harm the final outcome but possibly eliminates expensive human annotation of sample data.

Figure 3:
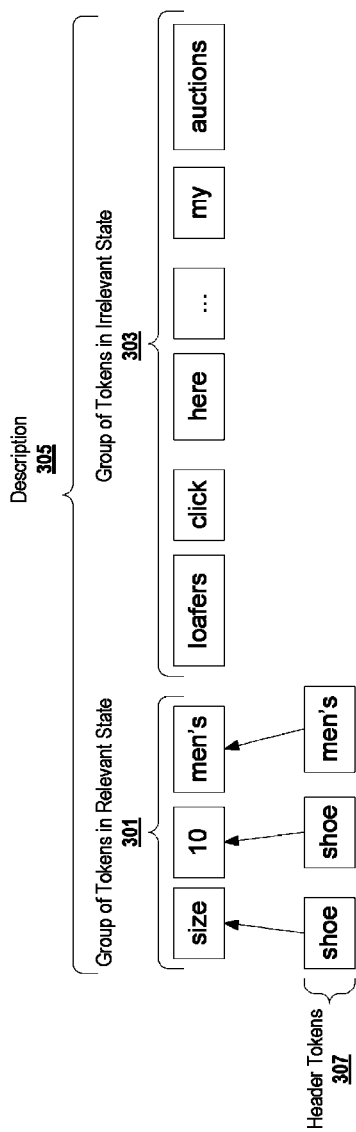
FIG. 3 is a graphical representation depicting an example of an iteration over a group of sequential tokens.
Figure 4:
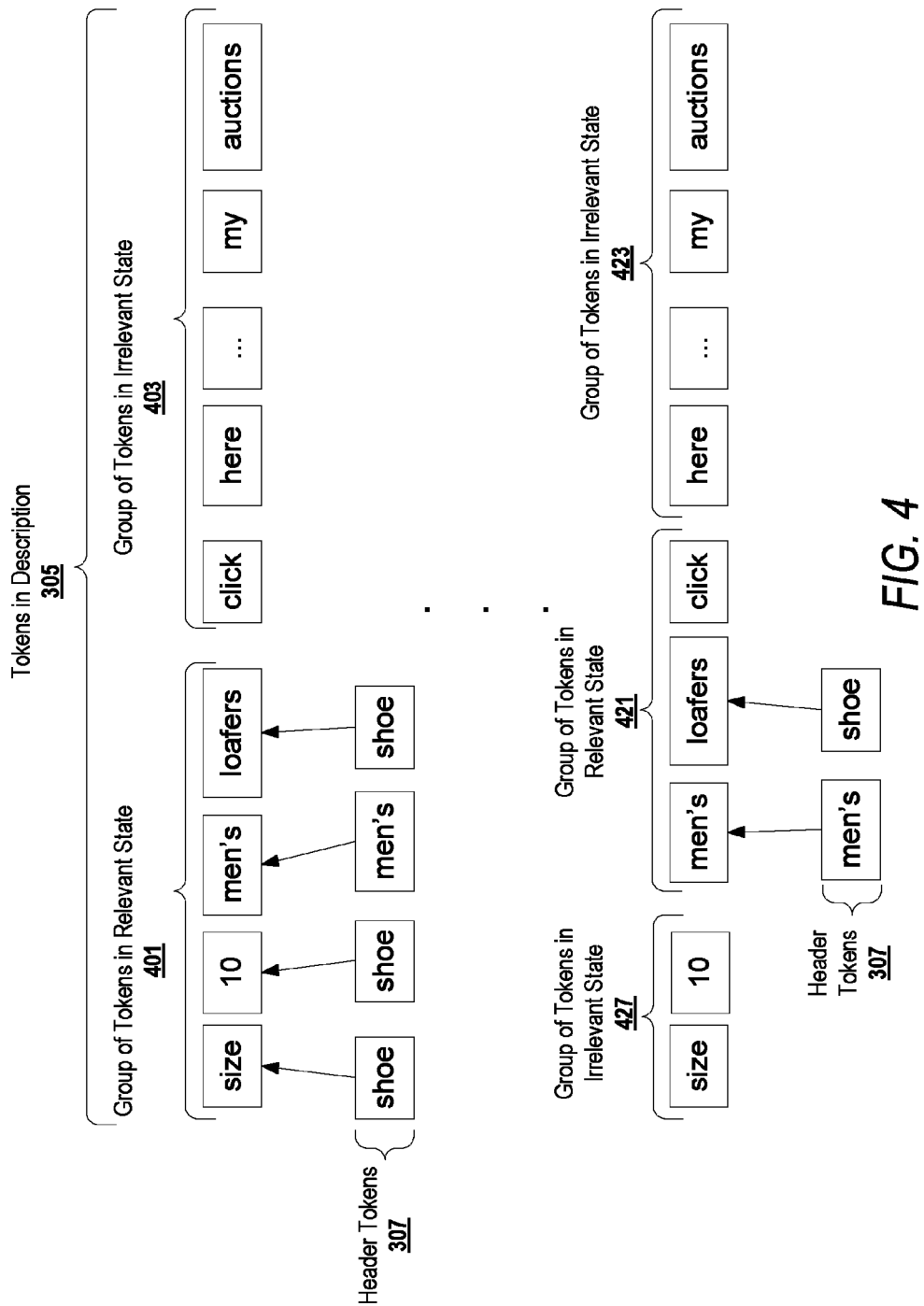
FIG. 4 is a graphical representation that depicts two examples of iterations over different token groups in the description from FIG. 3.

FIGS. 3-4 are graphical representations depicting examples of the process of iterating over different groups of sequential tokens. The example depicted in FIGS. 3 and 4 uses a generative modeling principle. For example, a generative author-topic model may be used relying on an assumption that a description of an offering (e.g., product or service for sale or auction) is generated by two types of authors: a "relevant" author and an "irrelevant" author. The relevant author produces tokens that constitute the relevant segment. The irrelevant author produces tokens that constitute the one or more irrelevant segments. Such a model can be represented using a model, such as a hidden Markov model. For instance, a simplified HMM with two states may be used to model this author-topic attribution with the states i) relevant state and ii) irrelevant state. It is assumed that in the irrelevant state the word probabilities are unconditional or raw probabilities. In the relevant state, the word probabilities are computed from any one of three sources: 1) header tokens; 2) lexical associations; and 3) probability of irrelevance if a token does not occur in the header and does not have a lexical association with a header token.

The example in FIGS. 3 and 4 assumes a header "Men's shoes," and a description "Size 10 men's loafers. Click here to see my 9 other shoe auctions" for a pair of shoes. FIG. 3 is a graphical representation depicting an example iteration over a group of sequential tokens. In FIG. 3, the depicted iteration designates a relevant segment or relevant group of sequential tokens 301 from a description 305 as "Size 10 men's" and the rest (i.e., group of tokens 303) as irrelevant. It has been determined that the tokens "size" and "10" have lexical associations with one of the header tokens 307 (the header token "shoe"). In addition, the word "men's" appears directly in the header. Each iteration assumes a particular model, thus the probability value computed for an iteration is the probability that the assumed model is accurate. The overall probability of the model for the depicted iteration can be expressed as $pr(model_1)=pr($"size" in description given "shoe" in header)*pr("10" in description given "shoe" in header)*pr("men's in header)*("loafer")*pr("click")*pr ("here")* . . . *pr(auctions). The expression pr($model_z$) represents the probability of model z assumed for a particular iteration.

FIG. 4 is a graphical representation that depicts two example iterations over different token groups in the description from FIG. 3. In FIG. 4, a first iteration designates a group of tokens 401 as a relevant segment. The group of tokens 401 includes "size 10 men's loafers." The rest of the description, which includes a group of tokens 303, is indicated as an irrelevant state group of tokens. It has been determined that the tokens "size", "10", and "loafers" have lexical associations with the header token "shoe." In addition, the word "men's" appears directly in the header. So the overall probability of this model, which indicates that the relevant group of tokens 301 "size 10 men's loafers" is relevant and the rest (i.e., group 303) irrelevant, is the multiplication of all the individual token probabilities. The overall probability for this second example iteration can be expressed as pr($model_2$)=pr("size" in description given "shoe" in header)*pr("10" in description given "shoe" in header)*pr("men's in header)*("loafer" in description given "shoe" in header)*pr("click")×pr("here")* . . . *pr(auctions).

The difference between the first and the second models from the different iterations is that the word "loafers" is included in the relevant segment for the second model. To compute the overall model probability, the unconditional probability (raw word probability) is replaced with the conditional probability of relevance for the token "loafer." The conditional probability is expected to be much higher due to the lexical association with the header token, so the overall probability of the second model is greater than the probability of the first model. In other words, the inclusion of the lexically associative word "loafers" in the relevant group of tokens boosts the overall model probability compared to the case when the "loafers" is not included.

FIG. 4 also depicts a third example iteration. This third example iteration shows that the relevant group has shifted over to include the group of tokens 421 beginning with the token "men's" and terminating at the token "click." The tokens in the segment "Size 10" now comprise a first group of tokens 427 in an irrelevant state. The tokens in the segment "here to see my 9 other shoe auctions" comprise a second group of tokens 423 in the irrelevant state. The overall probability of this third iteration can be expressed as pr($model_3$)=pr("size")*pr ("10")*pr("men's" in header)* ("loafer" in description given "shoe" in header)*pr("click") *pr("here")* . . . *pr(auctions). Note that relevance value for "click" is the same as the irrelevance value for "click," because "click" does not occur in the header and has not lexical association with a header token.

Figure 5:
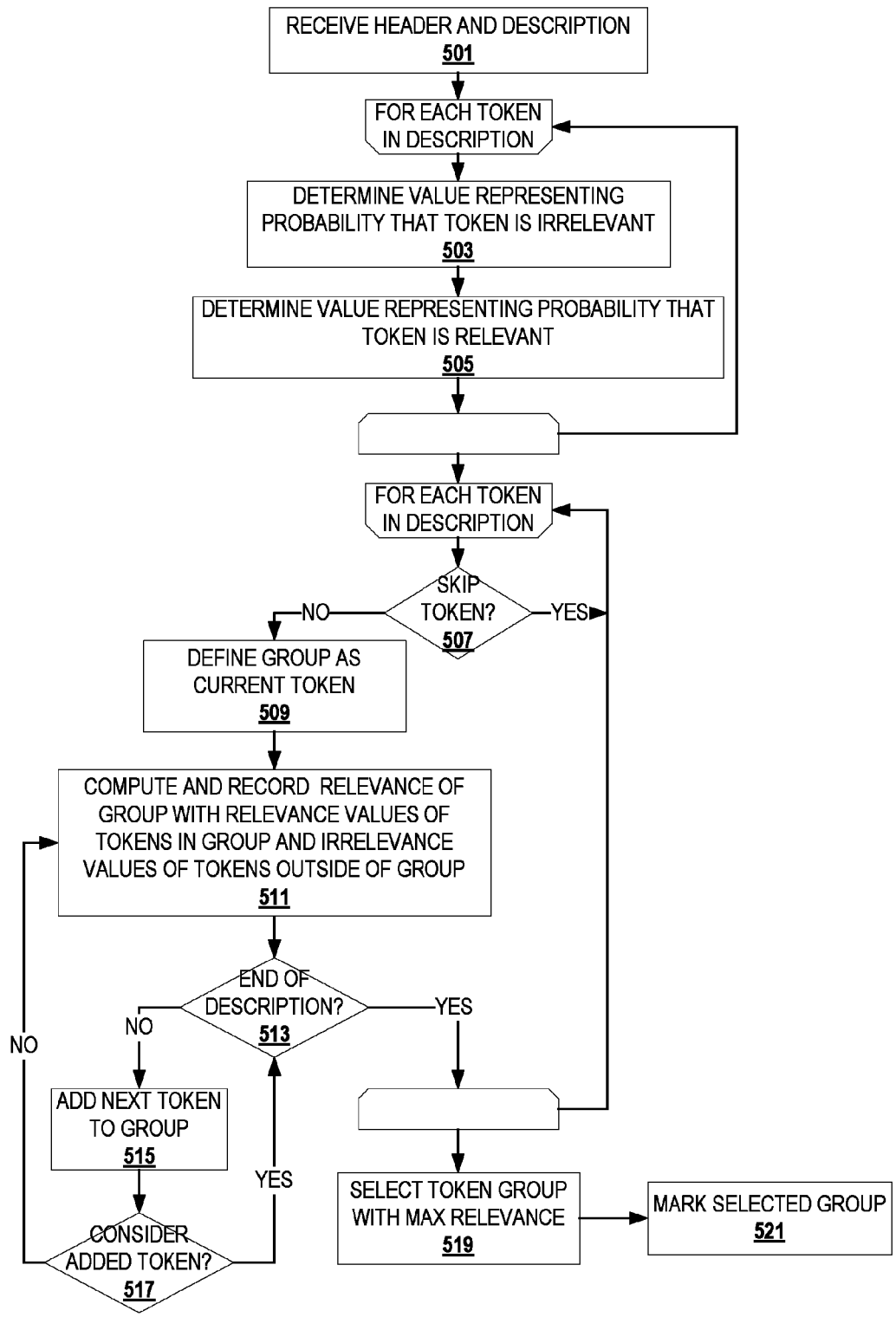
FIG. 5 is a flowchart depicting examples of operations for marking a group of tokens as most relevant in a description.

FIG. 5 is a flowchart of an example of one implementation for marking a group of tokens as most relevant in a description. At block 501, a header and a description are received. For each token in the block, operations of blocks 503 and 505 are performed. At block 503, a value representing a probability that a token is irrelevant is determined. At block 505, a value representing a probability that the token is relevant is determined. After the relevant values and irrelevant values are determined, another set of operations is performed for each token.

At block 507, it is determined if the current token is to be skipped. This operation is not necessary, but may be utilized to ignore certain "ubiquitous" or neutral tokens (e.g., articles, punctuation marks, etc.). If the token is to be skipped, then control flows to examining the next token. If the token is not to be skipped, control flows to block 509. At block 509, a current group is defined as the current token. At block 511, the relevance of the group of tokens is computed with the relevance values of the tokens in the group and with the irrelevance values of the tokens outside of the group, and the computed group relevance is recorded. At block 513, it is determined if the end of the description has been reached. If the end of the description has been reached, then control flows to the beginning of the loop. If the end of the description has not been reached, then control flows to block 515.

At block 515, the next consecutive token is added to the group. At block 517, it is determined whether the added token should be considered in the computation of relevance. If not, then control flows back to block 513. If the token added to the group is to be considered, then control flows to block 511. Disregarding some tokens in the computation of group relevance may reduce computation time and expenditure of resources. For example, a current group is "bike includes." The next token is "a." It is determined that the token "a" will not or should not have significant impact on the computation of group relevance, so the next consecutive token "carbon" is added to the group being evaluated ("bike includes a carbon") without considering a probability value for the token "a." Although the example represents recitation of all tokens in a group, the computation recording may track a current end of a segment or last added group member by reference, index, incrementing pointer, etc.

After termination of the loop, control flows to block 519. At block 519, the token group that exhibits the maximum computed relevance is selected. At block 521, the selected group is marked (e.g., tagged, a reference value is maintained, the group is copied, etc.).

Those of ordinary skill in the art will appreciate that the flowchart depicted in FIG. 5 is meant to aid in understanding the described embodiments and not meant to be limiting. For instance, the example operations depicted in the flowchart loop through each token in the description when determining values for the tokens. In such an implementation, a loop may iterate over each token in the header and compare the current header token against each description token. If a header token is observed in the description or a lexical association is found, then a relevance value is determined for the current header token. A default value may be assigned to each description token initially, which is overwritten if a header token matches the description token or if a lexical association exists between the header token and the description token. If neither condition is satisfied, then the default value remains. In another example, those description tokens that do not have a determined relevance value based on matching the header token or having a lexical association are assigned a default value. In addition, the order of operations are not intended to be limiting and are depicted as illustrative examples. For instance, the operations indicated in blocks 503 and 505 may be performed in parallel instead of sequentially; multiple cores may compute relevance values for different groups in parallel; etc. Furthermore, the operations indicated in the example flowchart are not intended to represent every possible operation. For example, flags may be set, pointers updated, data structures created, partial computations may be maintained for use for other groups, computed values may be recycled, etc.

Other examples may not ignore the transition probabilities between the states as in the above examples. Incorporating transition probabilities can potentially improve the accuracy of estimations.

Platform Architecture

Figure 6:
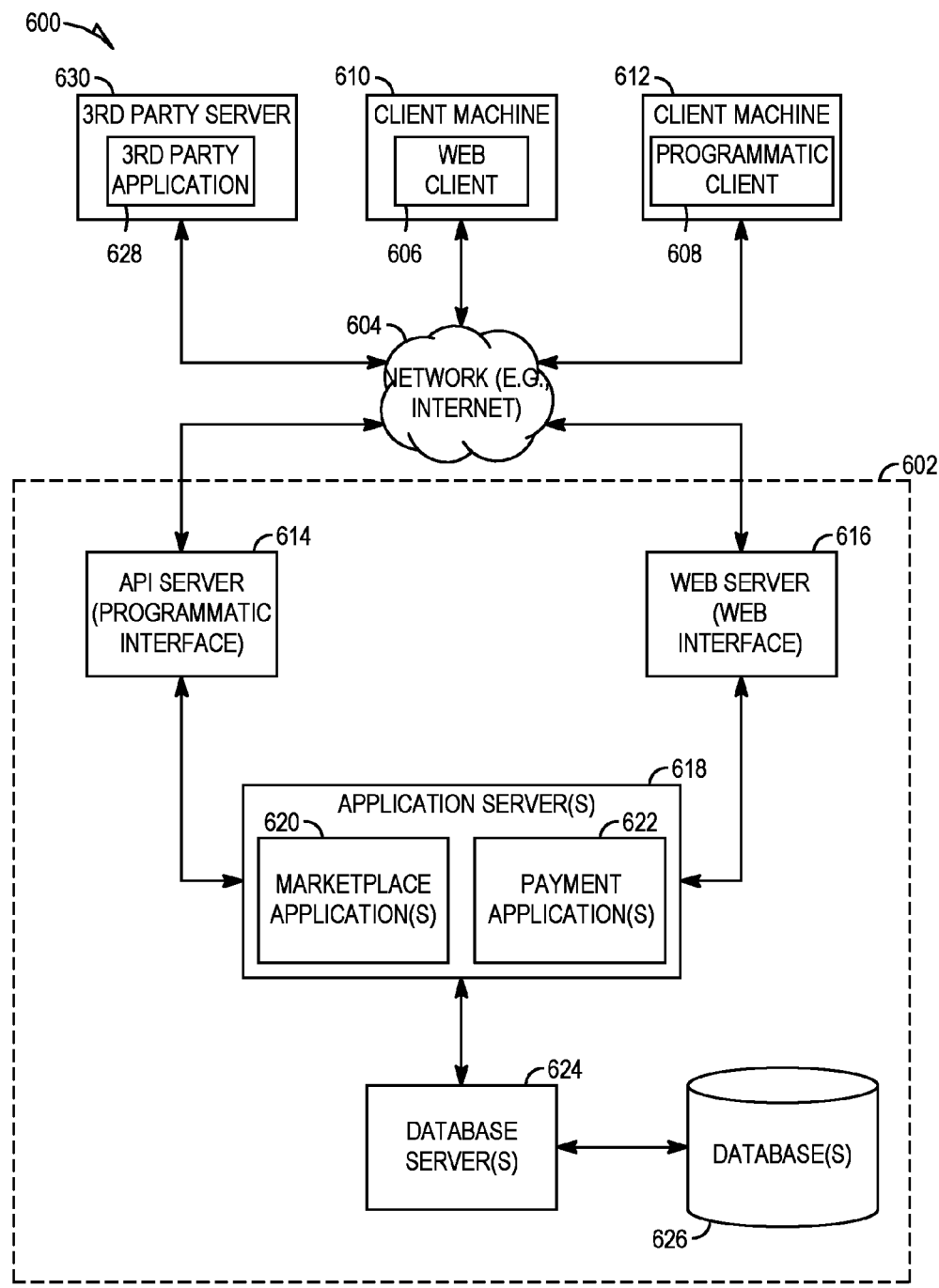
FIG. 6 is a network diagram depicting a client-server system 600, within which one example embodiment may be deployed.

FIG. 6 is a network diagram depicting a client-server system 600, within which one example embodiment may be deployed. A networked system 602, in the example forms of a network-based marketplace or publication system, provides server-side functionality, via a network 604 (e.g., the Internet or Wide Area Network (WAN)) to one or more clients. FIG. 6 illustrates, for example, a web client 606 (e.g., a browser, such as the Internet Explorer browser developed by Microsoft Corporation of Redmond, Wash.), and a programmatic client 608 executing on respective client machines 610 and 612.

An Application Program Interface (API) server 614 and a web server 616 are coupled to, and provide programmatic and web interfaces respectively to, one or more application servers 618. The application servers 618 host one or more marketplace applications 620 and payment applications 622. The application servers 618 are, in turn, shown to be coupled to one or more databases servers 624 that facilitate access to one or more databases 626.

The marketplace applications 620 may provide a number of marketplace functions and services to users that access the networked system 602. The payment applications 622 may likewise provide a number of payment services and functions to users. The payment applications 622 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 620. While the marketplace and payment applications 620 and 622 are shown in FIG. 6 to both form part of the networked system 602, it will be appreciated that, in alternative embodiments, the payment applications 622 may form part of a payment service that is separate and distinct from the networked system 602.

Further, while the system 600 shown in FIG. 6 employs a client-server architecture, the present invention is of course not limited to such an architecture, and could equally well find application in a distributed, or peer-to-peer, architecture system, for example. The various marketplace and payment applications 620 and 622 could also be implemented as standalone software programs, which do not necessarily have networking capabilities.

The web client 606 accesses the various marketplace and payment applications 620 and 622 via the web interface supported by the web server 616. Similarly, the programmatic client 608 accesses the various services and functions provided by the marketplace and payment applications 620 and 622 via the programmatic interface provided by the API server 614. The programmatic client 608 may, for example, be a seller application (e.g., the TurboLister application developed by eBay Inc., of San Jose, Calif.) to enable sellers to author and manage listings on the networked system 602 in an off-line manner, and to perform batch-mode communications between the programmatic client 608 and the networked system 602.

FIG. 6 also illustrates a third party application 628, executing on a third party server machine 630, as having programmatic access to the networked system 602 via the programmatic interface provided by the API server 614. For example, the third party application 628 may, utilizing information retrieved from the networked system 602, support one or more features or functions on a website hosted by the third party. The third party website may, for example, provide one or more promotional, marketplace or payment functions that are supported by the relevant applications of the networked system 602.

Marketplace Applications

Figure 7:
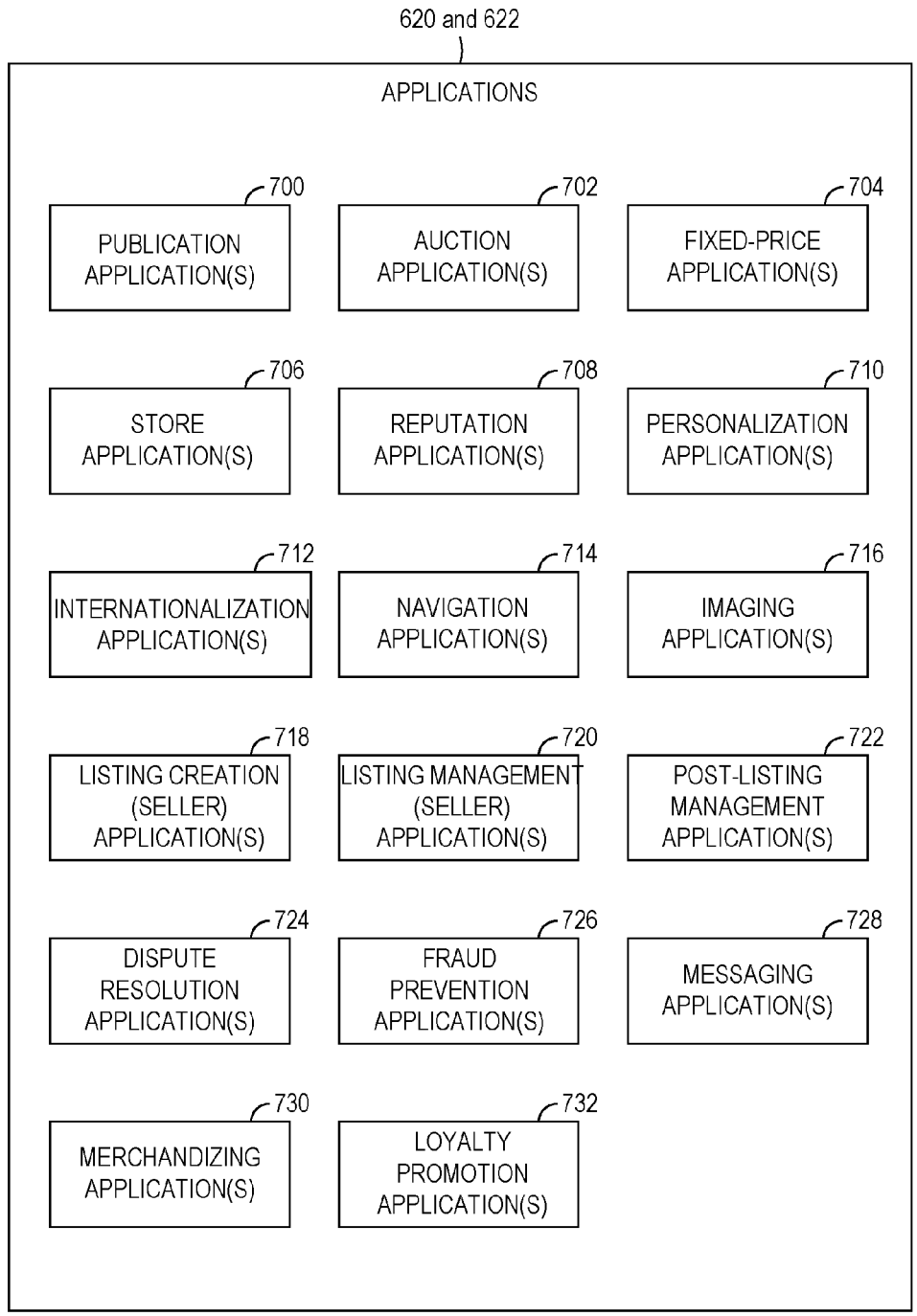
FIG. 7 is a block diagram illustrating multiple applications 620 and 622 that, in one example embodiment, are provided as part of the networked system 602.

FIG. 7 is a block diagram illustrating multiple applications 620 and 622 that, in one example embodiment, are provided as part of the networked system 602. The applications 620 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases 626 via the database servers 628.

The networked system 602 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 620 are shown to include at least one publication application 700 and one or more auction applications 702 which support auction-format listing and price setting mechanisms (e.g., English, Dutch, Vickrey, Chinese, Double, Reverse auctions etc.). The various auction applications 702 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 704 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 706 allow a seller to group listings within a "virtual" store, which may be branded and otherwise personalized by and for the seller. Such a virtual store may also offer promotions, incentives and features that are specific and personalized to a relevant seller.

Reputation applications 708 allow users that transact, utilizing the networked system 602, to establish, build and maintain reputations, which may be made available and published to potential trading partners. Consider that where, for example, the networked system 602 supports person-to-person trading, users may otherwise have no history or other reference information whereby the trustworthiness and credibility of potential trading partners may be assessed. The reputation applications 708 allow a user, for example through feedback provided by other transaction partners, to establish a reputation within the networked system 602 over time. Other potential trading partners may then reference such a reputation for the purposes of assessing credibility and trustworthiness.

Personalization applications 710 allow users of the networked system 602 to personalize various aspects of their interactions with the networked system 602. For example a user may, utilizing an appropriate personalization application 710, create a personalized reference page at which information regarding transactions to which the user is (or has been) a party may be viewed. Further, a personalization application 710 may enable a user to personalize listings and other aspects of their interactions with the networked system 602 and other parties.

The networked system 602 may support a number of marketplaces that are customized, for example, for specific geographic regions. A version of the networked system 602 may be customized for the United Kingdom, whereas another version of the networked system 602 may be customized for the United States. Each of these versions may operate as an independent marketplace, or may be customized (or internationalized) presentations of a common underlying marketplace. The networked system 602 may accordingly include a number of internationalization applications 712 that customize information (and/or the presentation of information) by the networked system 602 according to predetermined criteria (e.g., geographic, demographic or marketplace criteria). For example, the internationalization applications 712 may be used to support the customization of information for a number of regional websites that are operated by the networked system 602 and that are accessible via respective web servers 616.

Navigation of the networked system 602 may be facilitated by one or more navigation applications 714. For example, a search application (as an example of a navigation application) may enable key word searches of listings published via the networked system 602. A browse application may allow users to browse various category, catalogue, or inventory data structures according to which listings may be classified within the networked system 602. Various other navigation applications may be provided to supplement the search and browsing applications.

In order to make listings, available via the networked system 602, as visually informing and attractive as possible, the marketplace applications 620 may include one or more imaging applications 716 utilizing which users may upload images for inclusion within listings. An imaging application 716 also operates to incorporate images within viewed listings. The imaging applications 716 may also support one or more promotional features, such as image galleries that are presented to potential buyers. For example, sellers may pay an additional fee to have an image included within a gallery of images for promoted items.

Listing creation applications 718 allow sellers conveniently to author listings pertaining to goods or services that they wish to transact via the networked system 602, and listing management applications 720 allow sellers to manage such listings. Specifically, where a particular seller has authored and/or published a large number of listings, the management of such listings may present a challenge. The listing management applications 720 provide a number of features (e.g., auto-relisting, inventory level monitors, etc.) to assist the seller in managing such listings. One or more post-listing management applications 722 also assist sellers with a number of activities that typically occur post-listing. For example, upon completion of an auction facilitated by one or more auction applications 702, a seller may wish to leave feedback regarding a particular buyer. To this end, a post-listing management application 722 may provide an interface to one or more reputation applications 708, so as to allow the seller conveniently to provide feedback regarding multiple buyers to the reputation applications 708.

Dispute resolution applications 724 provide mechanisms whereby disputes arising between transacting parties may be resolved. For example, the dispute resolution applications 724 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 726 implement fraud detection and prevention mechanisms to reduce the occurrence of fraud within the networked system 602.

Messaging applications 728 are responsible for the generation and delivery of messages to users of the networked system 602, such messages for example advising users regarding the status of listings at the networked system 602 (e.g., providing "outbid" notices to bidders during an auction process or to provide promotional and merchandising information to users). Respective messaging applications 728 may utilize any one have a number of message delivery networks and platforms to deliver messages to users. For example, messaging applications 728 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 730 support various merchandising functions that are made available to sellers to enable sellers to increase sales via the networked system 602. The merchandising applications 80 also operate the various merchandising features that may be invoked by sellers, and may monitor and track the success of merchandising strategies employed by sellers.

The networked system 602 itself, or one or more parties that transact via the networked system 602, may operate loyalty programs that are supported by one or more loyalty/promotions applications 732. For example, a buyer may earn loyalty or promotions points for each transaction established and/or concluded with a particular seller, and be offered a reward for which accumulated loyalty points can be redeemed.

Data Structures

Figure 8:
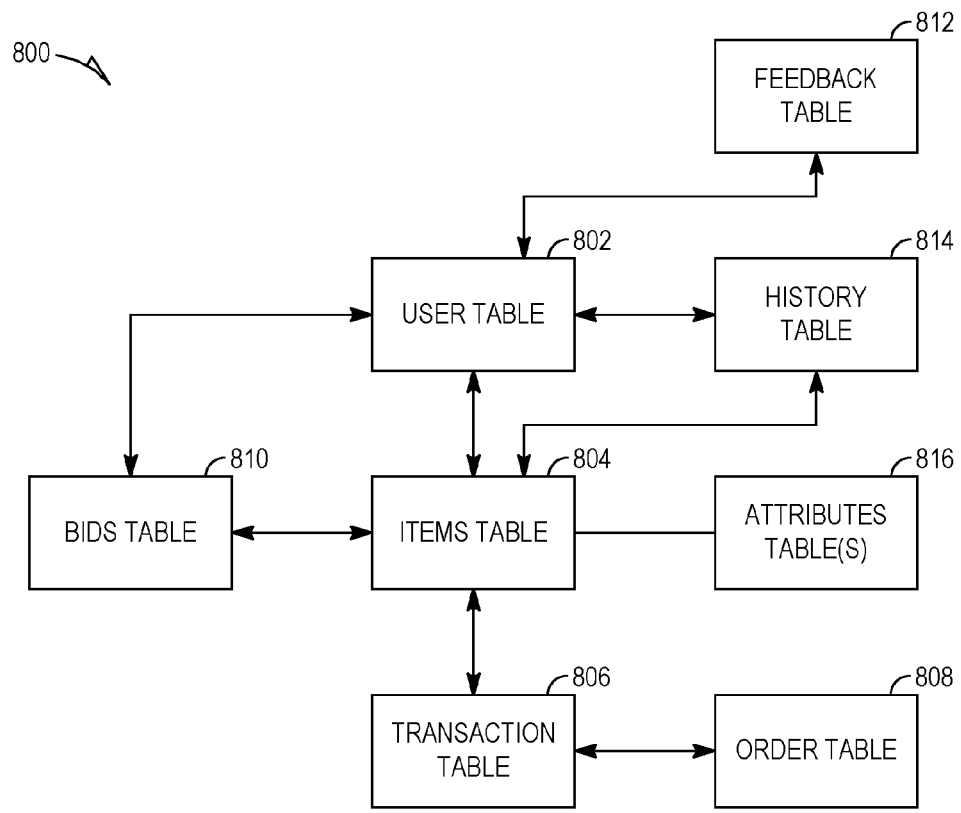
FIG. 8 is a high-level entity-relationship diagram, illustrating various tables 800 that may be maintained within the databases 626, and that are utilized by and support the applications 620 and 622.

FIG. 8 is a high-level entity-relationship diagram, illustrating various tables 800 that may be maintained within the databases 626, and that are utilized by and support the applications 620 and 622. A user table 802 contains a record for each registered user of the networked system 602, and may include identifier, address and financial instrument information pertaining to each such registered user. A user may operate as a seller, a buyer, or both, within the networked system 602. In one example embodiment, a buyer may be a user that has accumulated value (e.g., commercial or proprietary currency), and is accordingly able to exchange the accumulated value for items that are offered for sale by the networked system 602.

The tables 800 also include an items table 804 in which are maintained item records for goods and services that are available to be, or have been, transacted via the networked system 602. Each item record within the items table 804 may furthermore be linked to one or more user records within the user table 802, so as to associate a seller and one or more actual or potential buyers with each item record.

A transaction table 806 contains a record for each transaction (e.g., a purchase or sale transaction) pertaining to items for which records exist within the items table 804.

An order table 808 is populated with order records, each order record being associated with an order. Each order, in turn, may be with respect to one or more transactions for which records exist within the transaction table 806.

Bid records within a bids table 810 each relate to a bid received at the networked system 602 in connection with an auction-format listing supported by an auction application 702. A feedback table 812 is utilized by one or more reputation applications 708, in one example embodiment, to construct and maintain reputation information concerning users. A history table 814 maintains a history of transactions to which a user has been a party. One or more attributes tables 816 record attribute information pertaining to items for which records exist within the items table 804. Considering only a single example of such an attribute, the attributes tables 816 may indicate a currency attribute associated with a particular item, the currency attribute identifying the currency of a price for the relevant item as specified in by a seller.

Figure 9:
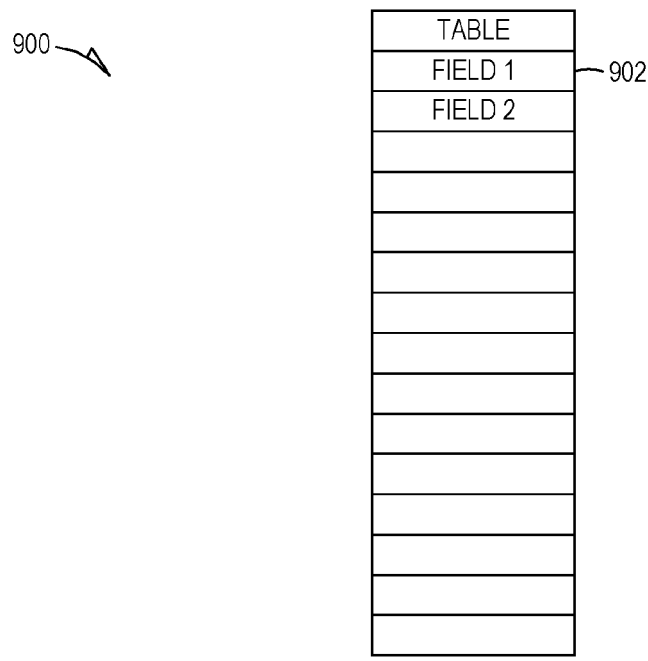
FIG. 9 provides further details regarding pertinent tables that are shown in FIG. 8 to be maintained within the databases 626.

FIG. 9 provides further details regarding pertinent tables that are shown in FIG. 8 to be maintained within the databases 626. A table 900 indicates an array of relevance values for tokens of a description. A field 902 includes assigned relevance and irrelevance values, as well as a pointer to the appropriate token of a description. Of course, those of ordinary skill in the art will appreciate that a variety of structures and/or combination of structures may host relevance values and pointers.

Figure 10:
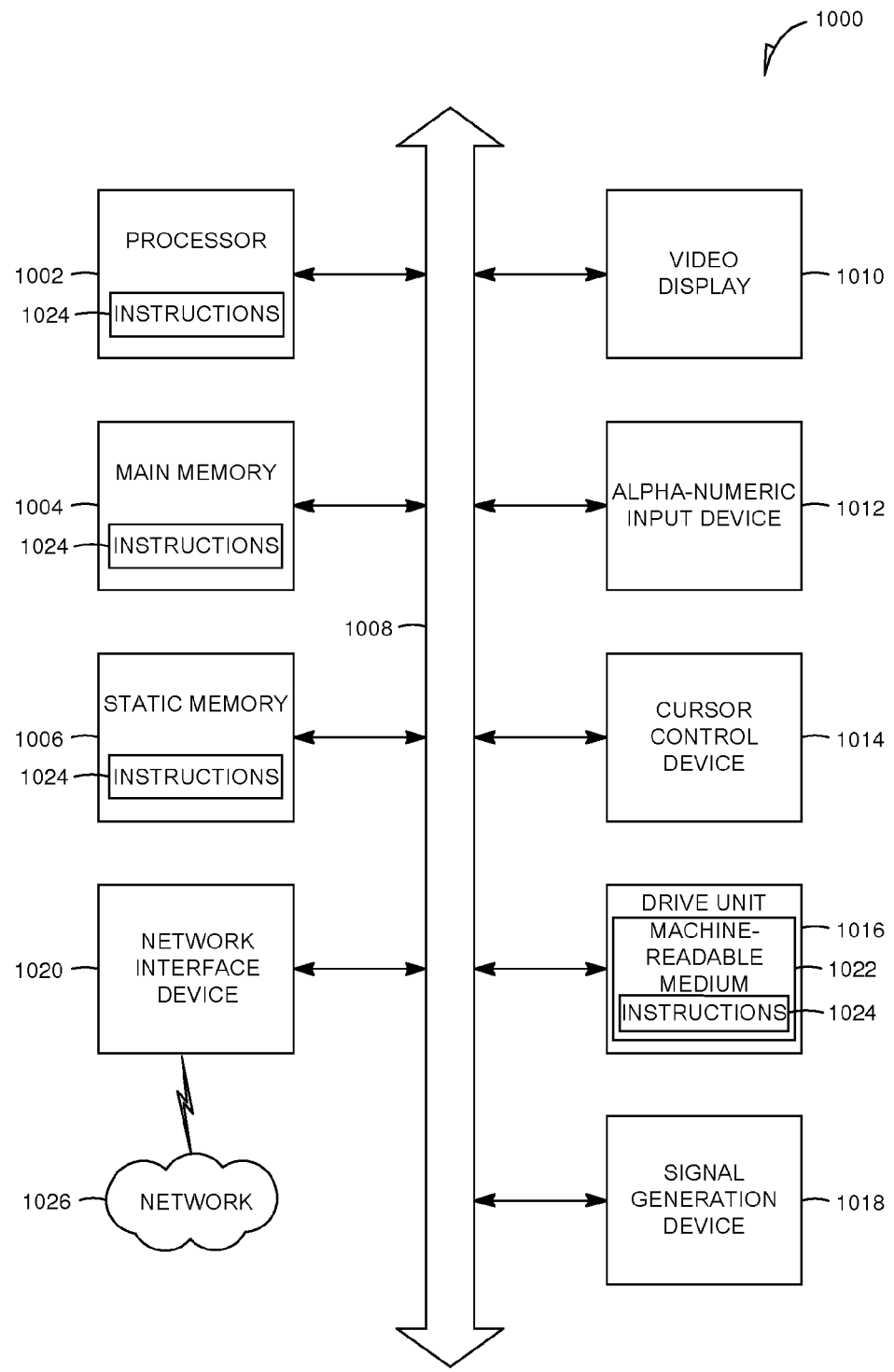
FIG. 10 shows a diagrammatic representation of machine in the example form of a computer system 1000 within which a set of instructions, for causing the machine to perform any one or more of the methodologies discussed herein, may be executed.

FIG. 10 shows a diagrammatic representation of machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical media and magnetic media.

Thus, a method and system to automatically segment a description based on tokens in a header for the description have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a processor-implemented segmentation module configured to:
   receive data from a client machine, the data comprising a product title and a product description;
   identify a first token in the product title;
   receive a token probability value associated with the first token;
   assign a value to the first token, the value indicating that, one of:
   the first token also occurs in the product description, a lexical association exists between the first token and a second token in the product description, and
   the lexical association does not exist and the first token is absent from the product description;
   compute a relevance value of a segmented group of tokens that occur in the product description and include the first token with the assigned value without requiring previously defined data tagging of the data beforehand of an unstructured text, the relevance value of the segmented group computed based on the value assigned to the first token; and
   determine and store in memory an indication that the segmented group of tokens is a most relevant segmented group of tokens in the product description;

15 wherein the assigning of the value to the first token includes:

initially assigning and storing a default value that indicates the lexical association does not exist and the first token is absent from the product description; and overwriting the stored initially assigned default value based on the first token occurring in the product description.

2. The system of claim 1, wherein:

the assigned value further indicates a relevance probability of the first token; and the computing of the relevance value of the segmented group of tokens is based on the relevance probability of the first token and further based on an irrelevance probability of the first token.

3. The system of claim 2, the processor-implemented segmentation module further configured to determine the irrelevance probability based on a proportion of descriptions that contain the first token within a set of descriptions.

4. The system of claim 1, the processor-implemented segmentation module further configured to determining that the lexical association exists between the first token and the second token by accessing a table that lexically associates the first token with the second token.

5. The system of claim 1, wherein:

the computing of the relevance value of the segmented group of tokens computes the relevance value of a segment of the description; and the indicating indicates that the segment is a most relevant segment of the description.

6. The system of claim 1, wherein:

the computing of the relevance value of the segmented group of tokens computes the relevance value of a sequence of tokens; and the indicating indicates that the sequence is a most relevant sequence of tokens in the description.

7. The system of claim 1, wherein the indicating that the segmented group of tokens is the most relevant segmented group of tokens in the description includes modifying a font of the most relevant segmented group of tokens in the description.

8. The system of claim 1, wherein the indicating that the segmented group of tokens is the most relevant segmented group of tokens in the description includes presenting the most relevant segmented group of tokens with the title of the description.

9. A method implemented on a processor-implemented segmentation module, the method comprising:

receiving data from a client machine, the data comprising a product title and a product description;

identifying a first token in the product title;

receiving a token probability value associated with the first token;

assigning a value to the first token, the value indicating that, one of:

the first token also occurs in the product description, a lexical association exists between the first token and a second token in the product description, and the lexical association does not exist and the first token is absent from the product title;

computing a relevance value of a segmented group of tokens that occur in the product description and include the first token with the assigned value without requiring previously defined data tagging of the data beforehand of an unstructured text, the relevance value of the segmented group computed based on the value assigned to the first token; and

16 determining and store in memory an indication that the segmented group of tokens is a most relevant segmented group of tokens in the product description;

wherein the assigning of the value to the first token includes;

initially assigning and storing a default value that indicates the lexical association does not exist and the first token is absent from the product description; and overwriting the stored initially assigned default value based on the first token occurring in the product description.

10. The method of claim 9, wherein:

the assigned value further indicates a relevance probability of the first token; and the computing of the relevance value of the segmented group of tokens is based on the relevance probability of the first token and further based on an irrelevance probability of the first token.

11. The method of claim 10, the method further comprising determining the irrelevance probability based on a proportion of descriptions that contain the first token within a set of descriptions.

12. The method of claim 9, the method further comprising determining that the lexical association exists between the first token and the second token by accessing a table that lexically associates the first token with the second token.

13. The method of claim 9, wherein:

the computing of the relevance value of the segmented group of tokens computes the relevance value of a segment of the description; and the indicating indicates that the segment is a most relevant segment of the description.

14. The method of claim 9, wherein:

the computing of the relevance value of the segmented group of tokens computes the relevance value of a sequence of tokens; and the indicating indicates that the sequence is a most relevant sequence of tokens in the description.

15. The method of claim 9, wherein the indicating that the segmented group of tokens is the most relevant segmented group of tokens in the description includes modifying a font of the most relevant segmented group of tokens in the description.

16. The method of claim 9, wherein the indicating that the segmented group of tokens is the most relevant segmented group of tokens in the description includes presenting the most relevant segmented group of tokens with the title of the description.

17. A system comprising:

a processor-implemented segmentation module configured to:

receive data from a client machine, the data comprising a product header and a product description;

identify a first token in the product header;

receive a token probability value associated with the first token;

assign a value to the first token, the value indicating that, one of:

the first token also occurs in the product description, a lexical association exists between the first token and a second token in the product description, and the lexical association does not exist and the first token is absent from the product header;

compute a relevance value of a segmented group of tokens that occur in the product description and include the first token with the assigned value without requiring previously defined data tagging of the data beforehand of an unstructured text, the relevance value of the segmented group computed based on the value assigned to the first token; and determining and storing in memory an indication that the segmented group of tokens is a most relevant segmented group of tokens in the product description;

wherein the assigning of the value to the first token includes:

initially assigning and storing a default value that indicates the lexical association does not exist and the first token is absent from the product description, and overwriting the stored initially assigned default value based on the first token occurring in the product description.

18. The system of claim 17, wherein:

the header of the description is a body of text shorter than the description and provides information about the description.

19. The system of claim 17, wherein:

the header of the description includes at least one of a title of the description, an abstract of the description, a summary of description, or a synopsis of the description.

20. The system of claim 17, the processor-implemented segmentation module further configured to determine an irrelevance probability of the first token based on a proportion of descriptions that contain the first token within a set of descriptions, wherein:

the assigned value further indicates a relevance probability of the first token; and the computing of the relevance value of the segmented group of tokens is based on the relevance probability of the first token and further based on the irrelevance probability.

* * * * *